United States Patent Office 2,924,604
Patented Feb. 9, 1960

2,924,604

O-ETHERS OF PYRIDINE ALDOXIMES

Arnolds Steinhards, Kalamazoo, Mich., and Wilhelm Mathes, Ludwigshafen (Rhine), Germany, assignors to Dr. F. Raschig, G.m.b.H., Ludwigshafen (Rhine), Germany No Drawing. Application April 23, 1958
Serial No. 730,241

16 Claims. (Cl. 260—296)

The present invention relates to new compounds and new herbicidal compositions, and is more particularly concerned with the O-ethers of pyridinealdoximes and with the use of these compounds for the control of undesired vegetation.

The compounds of the invention comprise compounds of the following general formula:

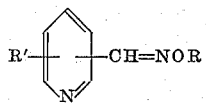

wherein R is a hydrocarbon radical containing from one to twelve carbon atoms and R' is selected from the class consisting of hydrogen atoms and methyl groups, and the acid addition salts thereof. The term "hydrocarbon radical containing from one to twelve carbon atoms" is intended to include (a) saturated and unsaturated acyclic aliphatic hydrocarbon radicals such as alkyl radicals of which examples are methyl, ethyl, propyl, butyl, amyl, hexyl, heptyl, octyl, nonyl, decyl, undecyl, and dodecyl radicals, and alkenyl radicals of which examples are allyl, butenyl, pentenyl, hexenyl, heptenyl and octenyl radicals, (b) saturated and unsaturated cycloaliphatic hydrocarbon radicals of which examples are cyclopropyl, cyclobutyl, cyclopentyl, 2-cyclopentenyl, 1-cyclonpentyl, cyclohexyl, 2-cyclohexenyl, cycloheptyl and cyclooctyl radicals, (c) saturated and unsaturated cycloaliphatic-alkyl hydrocarbon radicals of which examples are cyclopentylmethyl, 2-cyclopentenylmethyl, cyclohexylmethyl, 2-cyclohexenylmethyl, and cyclohexylethyl radicals, and (d) saturated and unsaturated araliphatic hydrocarbon radicals of which examples are benzyl, 2-phenethyl, cinnamyl, 1-naphthylmethyl, and 2-naphthylmethyl, radicals; and the like. The acid addition salts include the salts of compounds of the above general formula wtih acids such as hydrochloric acid, sulfamic acid, hydrobromic acid, thiocyanic acid, fluosilicic acid, nitric acid, phosphoric acid, sulfuric acid, formic acid, acetic acid, trichloroacetic acid, propionic acid, oxalic acid, succinic acid, methanesulfonic acid, p-toluenesulfonic acid, picric acid, benzoic acid, salicylic acid, etc.

It is an object of the present invention to provide the new and useful compounds designated by the above general formula. These compounds possess valuable properties as herbicides and can be used as general purpose weedkillers or as selective weedkillers, for example, for the control of crabgrass, bindweed, and like undesirable vegetation alone or in the presence of crops, for example, corn, beans, perennial grasses, etc. In addition, the compounds of the invention are active as central nervous system depressants. Some of the new compounds also have additional pharmacodynamic activity. For example, the O-2-phenethyl ether of 3-pyridinealdoxime and the O-2-phenethyl ether of 4-pyridinealdoxime are active in prolonging hexobarbital-induced sleep; the O-2-phenethyl ether of 6-methyl-2-pyridinealdoxime has anti-secretory activity; and the O-isoamyl ether of 2-pyridinealdoxime, the O-isoamyl ether of 3-pyridinealdoxime, and the O-isoamyl ether of 4-pyridinealdoxime have anti-viral activity when tested against vaccinia virus in tissue culture.

It is a further object of the invention to provide new herbicidal compositions which contain as active ingredient at least one of the compounds of the above general formula including their acid addition salts. It is yet a further object of the invention to provide a method of controlling undesired vegetation by application to such vegetation of at least one of the compounds of the above general formula, including their acid addition salts. Other objects of the invention will be apparent to those skilled in the art to which this invention belongs.

The novel compounds of the invention can be prepared by etherification of pyridinealdoximes of the general formula:

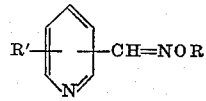

wherein R' has the significance hereinbefore described. The preparation of certain pyridinealdoximes of the above general formula has been described previously. Lénárt [Annalen, 409, 95 (1915)] described the preparation of 2-pyridinealdoxime by the reaction of picolinaldehyde with an equivalent of hydroxylamine hydrochloride and excess potassium carbonate in an aqueous medium. Craig and Hixon [J.A.C.S., 53, 4369 (1931)] prepared 3-pyridinealdoxime from nicotinaldehyde by an analogous procedure. Using the method of Lénárt (loc. cit.) or other conventional methods for the preparation of oximes, other pyridinealdoximes of the above general formula can be prepared from the corresponding pyridinecarboxaldehydes. For example, isonicotinaldehyde, 2-methylnicotinaldehyde, 6-methylpicolinaldehyde, 3-methylpicolinaldehyde, 4-methylpicolinaldehyde, 5-methylpicolinaldehyde, 2-methylisonicotinaldehyde, and 6-methylnicotinaldehyde can be converted to the corresponding aldoximes in this manner. The preparation and properties of such aldehydes are reviewed in "Chemistry of Carbon Compounds" [editor: E. H. Rodd], volume IV$^A$, p. 553 [Elsevier, 1957]. The etherification of the pyridinealdoximes can be effected by reaction of a pyridinealdoxime of the above general formula with a compound of the formula:

RX where R is a hydrocarbon radical containing one to twelve carbon atoms as hereinbefore defined and X represents a halogen atom selected from chlorine, bromine and iodine, in the presence of a base. Generally speaking, the preferred base employed in the etherification is sodium methoxide. Bases such as sodium ethoxide and like alkoxides, sodium hydroxide, potassium carbonate, etc., can also be employed. The reaction is normally carried out in a solvent in which the reactants, but not necessarily the base, are soluble. Methanol is the preferred solvent but solvents such as acetone, ethanol, 2-butanone, propanol and higher alkanols, can also be employed. The reaction is advantageously carried out at elevated temperature and preferably under conditions of reflux. The desired product can be isolated from the reaction mixture in a convenient manner by addition of water followed by solvent extraction of the oil which separates. The aldoxime O-ethers so obtained are oils which can be purified by distillation under reduced pressure. They readily form salts with both inorganic acids and organic acids, and the salts can be prepared in a convenient manner by neutralization of the pyridinealdoxime O-ether with an equivalent of the desired acid or, if desired, by metathesis.

The compounds of the invention show herbicidal activity and can be used to control undesirable vegetation. By "undesirable vegetation" is meant not only plants which are commonly regarded as weeds wherever they may grow, but also certain plants which are not normally regarded as weeds except when they are found growing on land which is supporting more valuable plants, for example, horticultural and agricultural crops. The compounds of the invention show particularly valuable activity against undesirable grasses such as crabgrass, against herbs such as buckwheat, and against common weeds such as bindweed.

The activity of the compounds is illustrated by the results of the following test. The test was carried out by spraying seedling plants to run off with an aqueous dispersion of various concentrations of the compound under test, the spray solution containing approximately 100 parts per million (0.01 percent) of Triton X-100 (a proprietary surfactant which is an alkylaryl polyether alcohol). The plants were examined two to four weeks after the application of the test compound and the condition of the crops was recorded on an arbitrary scale of 0 (no effect) through 5 (all plants dead). In Table I there is shown the name of the test compound, the concentration of compound in the final spray, the plants treated, and the final condition of the plants are expressed using the arbitrary scale.

TABLE I

| Compound | Conc. in final spray (p.p.m.) | Plant | | | |
|---|---|---|---|---|---|
| | | Crab-grass | Wheat | Buck-wheat | Bind-weed |
| O-n-propyl ether of 2-pyridine-aldoxime. | 8,000 | | 2 | 5 | 2 |
| | 4,000 | | 0 | 2 | 2 |
| O-n-propyl ether of 6-methyl-2-pyridine-aldoxime. | 8,000 | | 3 | 1 | 3 |
| O-n-amyl ether of 2-pyridine-aldoxime. | 6,000 | | 4 | 2-3 | 0 |
| | 3,000 | | 2 | 1-2 | 0 |
| O-2-phenethyl ether of 3-pyridinealdoxime. | 6,000 | | 4 | 5 | 4 |
| | 3,000 | | 2 | 4 | 1 |
| O-2-phenethyl ether of 4-pyridinealdixome. | 6,000 | | 3 | 5 | 4 |
| | 3,000 | | 4 | 5 | 4 |
| O-2-phenethyl ether of 6-methyl-2-pyridinealdoxime. | 6,000 | | 5 | 5 | 4 |
| | 3,000 | | 3 | 3 | 1 |
| | 2,000 | 5 | | | |
| O-benzyl ether of 6-methyl-2-pyridinealdoxime. | 6,000 | | 5 | 5 | 4 |
| | 3,000 | | 2 | 4 | 3 |
| | 2,000 | 3 | | | |
| O-isoamyl ether of 3-pyridinealdoxime. | 6,000 | | 1 | 5 | 1 |
| | 3,000 | | 1 | 1 | 1 |
| | 2,000 | 5 | | | |
| O-isoamyl ether of 4-pyridinealdoxime. | 6,000 | | 4 | 4 | 1 |
| | 3,000 | | 1 | 4 | 2 |
| | 2,000 | 5 | | | |
| O-isoamyl ether of 6-methyl-2-pyridinealdoxime. | 6,000 | | 2 | 2 | 2 |
| | 3,000 | | 1 | 1 | 0 |
| | 2,000 | 5 | | | |
| O-isoamyl ether of 2-pyridine-aldoxime. | 6,000 | | 1 | 1 | 0 |
| | 3,000 | | 0-1 | 2 | 1 |
| | 2,000 | 5 | | | |

For the selective control of undesired vegetation the compounds of the invention are applied at a rate within the range of about 0.02 to twenty pounds per acre, the preferred rate of application being about 0.5 to seven pounds per acre. Illustratively, the O-2-phenethyl ether of 6-methyl-2-pyridinealdoxime shows outstanding selective activity against grasses, including crabgrass growing in broadleaf crops, for example, beans and cucumbers.

For the non-selective control of undesired vegetation the compounds of the invention are applied at a rate within the range of about 0.2 to thirty pounds per acre, the preferred rate of application being about three to ten pounds per acre.

In order to achieve the maximum herbicidal effect of the compounds of the invention it is necessary to formulate the compounds in compositions which can be freely applied to vegetation and evenly distributed over the surface thereof. Accordingly, the method of preparation of the herbicidal compositions of the invention is a matter of importance.

The herbicidal compositions of the invention comprise as active ingredient at least one compound selected from the class of compounds having the formula:

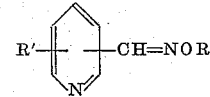

wherein R and R' have the significance hereinbefore defined and the acid addition salts thereof, in association with a carrier material. Where the compositions are to be employed as selective herbicides it is advantageous that the carrier material be phytonomic, that is to say, a carrier that can be applied to plants without phytotoxicity or other adverse effects. Where the compositions are to be employed as general herbicides such considerations do not apply.

The herbicidal compositions of the invention can take the form of dusts which are prepared by intimate admixture of the active ingredient with a solid carrier or extender which maintains the compositions in a dry, free-flowing state. Since the compounds of the above formula in the free base form are liquids, the herbicidal dusts of the invention can be prepared more conveniently by adding to the solid diluent the compound in solution in a volatile solvent such as ethanol or acetone, mixing to form a paste, drying, and milling. The solid carriers which can be used include the natural clays such as china clay and bentonite, minerals in the natural state such as talc, pyrophyllite, quartz, diatomaceous earth, fuller's earth, chalk, rock phosphate, and the chemically modified minerals such as washed bentonite, precipitated calcium phosphate, precipitated calcium carbonate, and colloidal silica. The solid diluents which can be employed in the compositions also include solid artificial fertilizers. The above types of solid compositions can be applied to vegetation in the form of dusts by use of conventional machinery. A preferred solid composition of the above type is one which also comprises a surfactant. Such compositions can be added to water to form aqueous dispersions which can be applied to vegetation by conventional spraying machines. The surfactants which can be employed in the preparation of such compositions include alkyl sulfates and sulfonates, alkylbenzenesulfonates, sulfosuccinate esters, polyoxyethylene sulfates, polyoxyethylene sorbitan monolaurate, alkylarylpolyether sulfates, alkylarylpolyether alcohols, alkylnaphthalenesulfonates, alkyl quaternary ammonium salts, sulfated fatty acid and esters, sulfated fatty acid amides, glycerol mannitan laurate polyalkylether condensates of fatty acids, and lignin sulfonates, the sulfates and sulfonates, of course, being used in the form of the soluble salts, for example, their sodium salts.

The herbicidal compositions of the invention also comprise aqueous emulsions. The aqueous emulsions can be prepared by dissolving the active ingredient in a water-miscible solvent such as Carbitol (diethylene glycol monoethyl ether), acetone or a lower alkanol, if desired, in association with a surfactant such as noted above, and pouring the solution into water with vigorous agitation.

The emulsions can be prepared also by dissolving the active ingredient and a surfactant such as noted above in an organic solvent which is immiscible with water. The resulting solution is then admixed with water with vigorous agitation to form an emulsion. The organic solvents which are suitable for use include aromatic hydrocarbons such as benzene, toluene, xylene and high-boiling petroleum hydrocarbons such as kerosene, diesel oil, etc.

The aqueous emulsions of the invention can be supplied to the user in the form of concentrates which require dilution with water before use. Both the concentrated compositions and the diluted compositions are included within the scope of the present invention.

The exact concentration of active ingredient in any of the compositions of the invention is not critical and may vary considerably, provided the active ingredient is applied to the vegetation to be treated at a rate within the range defined above. However, in general it has been found advantageous to employ concentrations of active ingredient of the order of 1,000–10,000 parts per million (0.1–1.0 percent) in the aqueous emulsions or dispersions used for the treatment of vegetation. The concentration of active ingredient in the concentrates from which these compositions are prepared may be as high as the order of fifty percent by weight. The concentration of active ingredient in the dust formulations of the invention is limited, in the case of compounds in the free base form, by the oily nature of the compounds. However, the concentration of active ingredient in the dust formulations of the invention is advantageously of the order of one to fifteen percent by weight.

The concentrations and the rates at which the compositions of the invention are applied will of course vary in accordance with factors such as the nature of the vegetation being treated, whether the treatment is a selective one, the season of the year at which the treatment is made, and the nature of the machine which is used to apply the composition.

The compositions of the invention also include compositions in which the active ingredients of the above formula are employed in combination with known herbicides. Such known herbicides include 2,4-dichlorophenoxyacetic acid, 2-methyl-4-chlorophenoxyacetic acid, 2,4,5-trichlorophenoxyacetic acid, ammonium sulfamate, dinitro-o-cresol, sodium arsenite, phenylmercuric acetate, isopropyl N-phenylcarbamate, isopropyl N-(3-chlorophenyl)carbamate, 3-(p-chlorophenyl)-1,1-dimethylurea, trichloroacetic acid, 2,2-dichloropropionic acid, sodium pentachlorophenate, and sodium chlorate.

The following examples are illustrative of the process and products of the present invention, but are not to be construed as limiting.

EXAMPLE 1

O-n-amylether of 2-pyridinealdoxime

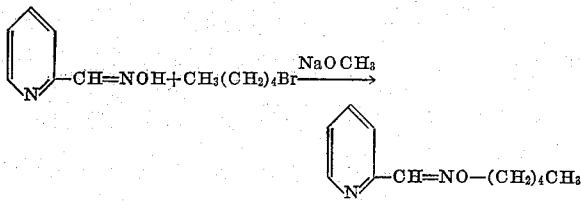

To a solution of 2.3 grams (0.1 mole) of sodium in one hundred milliliters of methanol was added 12.2 grams (0.1 mole) of 2-pyridinealdoxime (Lénárt, supra). The resulting solution was stirred while 15.1 grams (0.1 mole) of n-amyl bromide was added slowly and when the addition was complete the mixture was heated under reflux for one hour. After cooling the mixture, four hundred milliliters of water was added and the resulting red solution was extracted three times, each with one hundred milliliters of ether. The ether extracts were combined and washed with portions (four) of one hundred milliliters of water, until the washings were neutral. The colorless ether solution was dried over twenty grams of anhydrous sodium sulfate, filtered, and the ether removed by distillation. The colorless oil so obtained was distilled under reduced pressure to give 10.4 grams of the O-n-amyl ether of 2-pyridinealdoxime having a boiling point of 76–78 degrees centigrade at 0.08 millimeter of mercury pressure; $n_D^{20}=1.5202$.

EXAMPLE 2

O-n-propyl ether of 2-pyridinealdoxime

Using the procedure described in Example 1, but substituting n-propyl chloride for n-amyl bromide, there was obtained the O-n-propyl ether of 2-pyridinealdoxime; $n_D^{20}=1.5238$.

EXAMPLE 3

O-n-propyl ether of 3-pyridinealdoxime

Using the procedure described in Example 1, but substituting 3-pyridinealdoxime (Craig and Hixon, supra) for 2-pyridinealdoxime and n-propyl chloride for n-amyl bromide, there was obtained the O-n-propyl ether of 3-pyridinealdoxime; $n_D^{20}=1.5291$.

PREPARATION 1

4-pyridinealdoxime 4-pyridinealdoxime was prepared from isonicotinaldehyde [Wibaut, Kooyman and Boer, Rec. trav. chim. 64, 30–34 (1945)] using the process described by Lénárt (loc. cit.) for the preparation of 2-pyridinealdoxime.

EXAMPLE 4

O-n-propyl ether of 4-pyridinealdoxime

Using the procedure described in Example 1, but substituting 4-pyridinealdoxime for 2-pyridinealdoxime and n-propyl chloride for n-amyl bromide, there was obtained the O-n-propyl ether of 4-pyridinealdoxime; $n_D^{20}=1.5278$.

PREPARATION 2

6-methyl-2-pyridinealdoxime 6-methyl-2-pyridinealdoxime was prepared from 6-methylpicolinaldehyde [Mathes, Sauermilch and Klein, Berichte, 86, 584–8 (1953)] using the process described by Lénárt (loc. cit.) for the preparation of 2-pyridinealdoxime.

EXAMPLE 5

O-n-propyl ether of 6-methyl-2-pyridinealdoxime

Using the procedure described in Example 1, but substituting 6-methyl-2-pyridinealdoxime for 2-pyridinealdoxime and n-propyl chloride for n-amyl bromide, there was obtained the O-n-propyl ether of 6-methyl-2-pyridinealdoxime; $n_D^{20}=1.5214$.

EXAMPLE 6

O-2-phenethyl ether of 3-pyridinealdoxime

Using the procedure described in Example 1, but substituting 3-pyridinealdoxime for 2-pyridinealdoxime and 2-phenethyl chloride for n-amyl bromide, there was obtained the O-2-phenethyl ether of 3-pyridinealdoxime; $n_D^{20}=1.5840$.

EXAMPLE 7

O-2-phenethyl ether of 4-pyridinealdoxime

Using the procedure described in Example 1, but substituting 4-pyridinealdoxime for 2-pyridinealdoxime and 2-phenethyl chloride for n-amyl bromide, there was obtained the O-2phenethyl ether of 4-pyridinealdoxime; $n_D^{20}=1.5829$.

EXAMPLE 8

O-2-phenethyl ether of 6-methyl-2-pyridinealdoxime and hydrochloride thereof

Using the procedure described in Example 1, but substituting 6-methyl-2-pyridinealdoxime for 2-pyridinealdoxime and 2-phenethyl chloride for n-amyl bromide, there was obtained the O-2-phenethyl ether of 6-methyl-2-pyridinealdoxime; $n_D^{20}=1.5725$.

Two grams of the aldoxime ether prepared as described above was dissolved in twenty milliliters of anhydrous ether. The solution was cooled in ice water while an excess of dry hydrogen chloride was passed in. The solid which separated was collected, washed with ether, and dried. There was thus obtained 1.9 grams of the hydrochloride of the O-2-phenethyl ether of 6-methyl-2-pyridinealdoxime in the form of a crystalline solid which had a melting point of 135 to 138 degrees centigrade.

EXAMPLE 9

*O-benzyl ether of 6-methyl-2-pyridinealdoxime*

Using the procedure described in Example 1, but substituting 6-methyl-2-pyridinealdoxime for 2-pyridinealdoxime and benzyl chloride for n-amyl bromide, there was obtained the O-benzyl ether of 6-methyl-2-pyridinealdoxime; $n_D^{20}=1.5805$.

EXAMPLE 10

*O-isoamyl ether of 2-pyridinealdoxime*

Using the procedure described in Example 1, but substituting isoamyl chloride for n-amyl bromide, there was obtained the O-isoamyl ether of 2-pyridinealdoxime; $n_D^{20}=1.5160$.

EXAMPLE 11

*Oisoamyl ether of 3-pyridinealdoxime*

Using the procedure described in Example 1, but substituting 3-pyridinealdoxime for 2-pyridinealdoxime and isoamyl chloride for n-amyl bromide, there was obtained the O-isoamyl ether of 3-pyridinealdoxime; $n_D^{20}=1.5181$.

EXAMPLE 12

*O-isoamyl ether of 4-pyridinealdoxime*

Using the procedure described in Example 1, but substituting 4-pyridinealdoxime for 2-pyridinealdoxime and isoamyl chloride for n-amyl bromide, there was obtained the O-isoamyl ether of 4-pyridinealdoxime; $n_D^{20}=1.5170$.

EXAMPLE 13

*O-isoamyl ether of 6-methyl-2-pyridinealdoxime*

Using the procedure described in Example 1, but substituting 6-methyl-2-pyridinealdoxime for 2-pyridinealdoxime and isoamyl chloride for n-amyl bromide, there was obtained the O-isoamyl ether of 6-methyl-2-pyridinealdoxime; $n_D^{20}=1.5132$.

PREPARATION 3

*2-methyl-4-pyridinealdoxime*

2-methyl-4-pyridinealdoxime was prepared from 2-methylisonicotinaldehyde [Mathes and Sauermilch, Chem. Ztg., 80, 475 (1956)] using the process described by Lénárt (loc. cit.) for the preparation of 2-pyridinealdoxime.

EXAMPLE 14

*O-allyl ether of 2-methyl-4-pyridinealdoxime*

Using the procedure described in Example 1, but substituting 2-methyl-4-pyridinealdoxime for 2-pyridinealdoxime and allyl bromide for n-amyl bromide, there was obtained the O-allyl ether of 2-methyl-4-pyridinealdoxime.

EXAMPLE 15

An emulsifiable concentrate suitable for dilution with water to give a herbicidal emulsion was prepared by dissolving two grams of the O-2-phenethyl ether of 6-methyl-2-pyridinealdoxime and 0.25 gram of Triton X–100 (an alkylaryl polyether alcohol) in eight grams of Carbitol (diethylene glycol monoethyl ether) to form a clear solution. This solution is added to five hundred milliliters of water to yield an oil-in-water emulsion containing 4000 parts per million of active ingredient. The emulsion is employed as a herbicide by application to vegetation at the rate of 2.5 to five gallons per one thousand square feet.

Using an analogous procedure, emulsifiable concentrates and oil-in-water emulsions can be prepared using as active ingredient the compounds described in Examples 1, 2, 3, 4, 5, 6, 7, 9, 10, 11, 12, 13 and 14 above.

EXAMPLE 16

A dispersible powder suitable for addition to water to form an aqueous dispersion was prepared by mixing intimately three grams of the O–2-phenethyl ether of 6-methyl-2-pyridinealdoxime and seven grams of a calcium silicate having a particle size of the order of five microns. To the product was added 0.5 gram of Pluronic F68 (an ethylene oxide-propylene glycol condensate) and the mixture was macerated to give a fine dry powder. This powder is added to one liter of water to give an aqueous dispersion containing 3000 parts per million of active ingredient.

Using an analogous procedure, dispersible powders and aqueous dispersions can be prepared using as active ingredients the compounds described in Examples 1, 2, 3, 4, 5, 6, 7, 9, 10, 11, 12, 13 and 14 above.

It is to be understood that the invention is not to be limited to the exact details of operation or compounds shown and described, as obvious modifications and equivalents will be apparent to one skilled in the art, and the invention is therefore to be limited only by the scope of the appended claims.

We claim:
1. The compound selected from the class consisting of compounds of the formula:

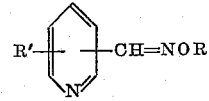

wherein R is a hydrocarbon radical having from one to twelve carbon atoms selected from the class consisting of alkyl, alkenyl, cycloalkyl, cycloalkenyl, cycloalkylalkyl, cycloalkenylakyl, aralkyl and aralkenyl radicals and R' is selected from the class consisting of hydrogen atoms and methyl groups and the acid addition salts thereof.
2. The O-n-propyl ether of 2-pyridinealdoxime.
3. The O-n-propyl ether of 3-pyridinealdoxime.
4. The O-n-propyl ether of 4-pyridinealdoxime.
5. The O-n-amyl ether of 2-pyridinealdoxime.
6. The O-n-propyl ether of 6-methyl-2-pyridinealdoxime.
7. The O-2-phenethyl ether of 3-pyridinealdoxime.
8. The O-2-phenethyl ether of 4-pyridinealdoxime.
9. The O-2-phenethyl ether of 6-methyl-2-pyridinealdoxime.
10. The hydrochloride of the O-2-phenethyl ether of 6-methyl-2-pyridinealdoxime.
11. The O-benzyl ether of 6-methyl-2-pyridinealdoxime.
12. The O-isoamyl ether of 2-pyridinealdoxime.
13. The O-isoamyl ether of 3-pyridinealdoxime.
14. The O-isoamyl ether of 4-pyridinealdoxime.
15. The O-isoamyl ether of 6-methyl-2-pyridinealdoxime.
16. The O-allyl ether of 2-methyl-4-pyridinealdoxime.

References Cited in the file of this patent

UNITED STATES PATENTS

| | | |
|---|---|---|
| 2,505,461 | Cislak | Apr. 25, 1950 |
| 2,634,200 | Schlesinger | Apr. 7, 1953 |
| 2,637,647 | Kosmin | May 5, 1953 |
| 2,727,895 | Sperber et al. | Dec. 20, 1955 |